United States Patent
Samara-Rubio et al.

(10) Patent No.: US 7,242,866 B2
(45) Date of Patent: Jul. 10, 2007

(54) METHODS AND APPARATUS FOR SWITCHING N OPTICAL INPUT SIGNALS TO M OPTICAL OUTPUTS

(75) Inventors: Dean Samara-Rubio, San Jose, CA (US); Chunli Cai, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 670 days.

(21) Appl. No.: 10/230,455

(22) Filed: Aug. 29, 2002

(65) Prior Publication Data

US 2004/0042792 A1    Mar. 4, 2004

(51) Int. Cl.
*H04J 14/00*    (2006.01)

(52) U.S. Cl. .......................................................... 398/45

(58) Field of Classification Search ............ 398/48–51, 398/55, 56, 45; 385/15, 17; 359/290, 117, 359/110
See application file for complete search history.

(56) References Cited

U.S. PATENT DOCUMENTS

| | | | |
|---|---|---|---|
| 5,434,691 A * | 7/1995 | Yamane .......................... | 398/5 |
| 5,661,825 A | 8/1997 | Van Dam et al. | |
| 5,838,844 A | 11/1998 | Van Dam et al. | |
| 5,862,279 A | 1/1999 | Amersfoort et al. | |
| 5,862,288 A | 1/1999 | Tayag et al. | |
| 5,870,216 A * | 2/1999 | Brock et al. .................... | 398/49 |
| 5,933,554 A | 8/1999 | Leuthold et al. | |
| 6,084,992 A | 7/2000 | Weber et al. | |
| 6,144,779 A | 11/2000 | Binkley et al. | |
| 6,222,955 B1 | 4/2001 | Lagali et al. | |
| 6,253,000 B1 | 6/2001 | Madsen et al. | |
| 6,292,597 B1 | 9/2001 | Lagali et al. | |
| 6,374,013 B1 | 4/2002 | Whiteaway et al. | |
| 6,393,169 B1 | 5/2002 | Paniccia et al. | |
| 6,421,473 B1 | 7/2002 | Paniccia et al. | |
| 6,434,289 B1 | 8/2002 | Paniccia et al. | |
| 6,449,405 B1 | 9/2002 | Paniccia et al. | |
| 6,456,754 B1 | 9/2002 | Augustsson | |
| 6,463,193 B2 | 10/2002 | Paniccia et al. | |
| 6,470,104 B2 | 10/2002 | Paniccia et al. | |
| 6,504,965 B2 | 1/2003 | Paniccia et al. | |
| 6,587,605 B2 | 7/2003 | Paniccia et al. | |
| 6,603,893 B1 | 8/2003 | Liu et al. | |

(Continued)

OTHER PUBLICATIONS

Bachmann et al. General Self-Imaging Properties in N×N Multimode Interference Couplers Including Phase Relations. *Applied Optics*, vol. 33, No. 18 (Jun. 20, 1994), pp. 3905-3911.

(Continued)

*Primary Examiner*—Jason Chan
*Assistant Examiner*—Quan-Zhen Wang
(74) *Attorney, Agent, or Firm*—Hanley, Flight & Zimmerman, LLC

(57) ABSTRACT

Apparatus and methods for switching N optical input signals to M optical outputs are disclosed. In an example, an apparatus includes a plurality of optically transparent fabrics. Each of the fabrics receive at least one optical input signal and switch that received signal to at least one of a plurality of intermediate outputs. A multiplexer is operatively coupled between the intermediate outputs of the plurality of optically transparent fabrics and the M optical outputs.

10 Claims, 5 Drawing Sheets

U.S. PATENT DOCUMENTS

| | | | |
|---|---|---|---|
| 6,650,802 B1* | 11/2003 | Morse et al. ................. | 385/17 |
| 6,657,770 B2* | 12/2003 | Marom et al. .............. | 359/290 |
| 2001/0022878 A1 | 9/2001 | Saida et al. | |
| 2002/0051601 A1 | 5/2002 | Hung | |
| 2002/0089711 A1 | 7/2002 | Conzone et al. | |
| 2002/0159686 A1 | 10/2002 | Madsen | |
| 2002/0191886 A1 | 12/2002 | Castoldi et al. | |
| 2003/0002767 A1 | 1/2003 | Hanneman, Jr. | |
| 2003/0026524 A1* | 2/2003 | Kakizaki et al. .............. | 385/16 |
| 2003/0053731 A1 | 3/2003 | Bhowmik | |
| 2004/0057655 A1* | 3/2004 | Mori et al. .................. | 385/17 |

OTHER PUBLICATIONS

Rasmussen et al. Design and Performance Evaluation of 1-by-64 Multimode Interference Power Splitter for Optical Communications. *Institute for Electrical and Electronics Engineers Journal of Lightwave Technology*, vol. 13, No. 10 (Oct. 1995), pp. 2069-2073.

Smit et al. PHASAR-Based WDM-Devices: Principles, Design and Applications. *Institute for Electrical and Electrical and Electronics Engineers Journal of Selected Topics in Quantum Electronics*, vol. 2, No. 2 (Jun. 1996), pp. 236-250.

Rajarajan et al. Accurate Analysis of MMI Devices with Two-Dimensional Confinement. *Institute for Electrical and Electronics Engineers Journal of Lightwave Technology*, vol. 14, No. 9 (Sep. 1996), pp. 2078-2084.

Kareenahalli et al. Experimental Confirmation of Phase Relationships of Multimode Interference Splitters Using a Shearing-Type Near-Field Sagnac Interferometer. *Institute for Electrical and Electronics Engineers Photonics Technology Letters* (Jul. 1997), pp. 937-939.

Lorenzo et al. Improved Self-Imaging Characteristics in 1×N Multimode Couplers. *Institute for Electrical and Electronics Engineers Proceedings Online*, No. 19981721 (Sep. 29, 1997), pp. 65-69.

Soldano et al. Optical Multi-Mode Interference Devices Based on Self-Imaging: Principles and Applications. *Institute for Electrical and Electronics Engineers Journal of Lightwave Technology*, vol. 13, No. 4 (Apr. 1995), pp. 615-627.

* cited by examiner

METHODS AND APPARATUS FOR SWITCHING N OPTICAL INPUT SIGNALS TO M OPTICAL OUTPUTS

FIELD OF THE DISCLOSURE

This disclosure relates generally to optical switches and, more particularly, to methods and apparatus for switching N optical input signals to M optical input signals.

BACKGROUND

Optical phase shifters using polysilicon capacitors embedded in silicon on insulator (SOI) waveguides are known. The charges accumulated on the plates of the capacitors change the effective propagation velocity of infrared light through the corresponding SOI waveguides. To inject and hold the charges on the capacitor plates, an electronic driver is required for each capacitor.

One promising application for the polysilicon phase shifter is an optically transparent switching fabric (N×M matrix) to route bursts of information packets (e.g., internet protocol (IP) packets) or even individual IP packets through an optical communications network. The basic physics behind the matrix is a phased-array architecture which is a proven technique for steering beams of IR (infrared) light in waveguides fabricated in InP (Indium Phosphide) and other materials.

In principal, a multiple-input and multiple-output non-blocking switch fabric can be made through a simple extension of the beam-steering concept. However, obtaining the necessary level of optical performance of a medium-scale switch fabric is non-trivial. This is especially true when the settling time of the switch must be driven down to 10's of nanoseconds as will be required for an optical packet switch. To appreciate the challenges from an electronic control perspective, it is useful to calculate the number of independent high-speed analog signals to control a M×N switch fabric.

The parameters M and N are the scale of the switch where M represents the number of output ports and N represents the number of input ports of the switch. For example, M=N=8 and M=N=16 are typical values. Parameters k and D are governed by specifications of optical cross-talk and optical loss. In general, both k and D will increase as the number of optical outputs (M) increase. D is the resolution of the voltage applied to the waveguides and, thus, corresponds to the resolution in phase accuracy of the phase-shifter. A value of D=8 would be adequate for an 8×8 fabric. The final parameter, k, is the number of signals developed by the multimode interference splitters in the switch and affects the clarity of beam steering and, thus, the overall performance of the switch. K must be 4 or larger for an 8×8 switch. Thus, the number of independent high-speed analog signals is k*M*N=256 signals for an 8×8 switch, and at least 1024 signals for a 16×16 switch. In addition to just the sheer number of interconnects, the ASIC die area, peak switching current, standby power dissipation, and peak power dissipation must be considered.

Typical switching current per interconnection is (750 pF*2.5V/10 ns)~200 mA. For a 16×16 switch, the peak switching current would be a significant value of 200A. Care must be taken in design of the power distribution network of the switch because transients in the supply voltages and electrical crosstalk can greatly extend the settling time of the analog voltages and, thus, become limiting factors in the switch settling time (e.g., all analog voltages must have settled to within 1 LSB (Least Significant Bit) for the switch to be settled).

For the same 16×16 switch, the die area of the DAC (Digital To Analog Converter) drivers will also be considerable. Depending on the DAC architecture selected, we can expect at least 3 mm$^2$ of die area per DAC to give a total die area of about 3000 mm$^2$, or approximately 5.5 cm×5.5 cm. This area will be subdivided into many smaller driver chips and, thus, the total board area will be much larger when packaging and board-level interconnects are taken into account. The end result is that some DACs will be physically quite far (up to 10 cm) from the array of optical waveguides. Even with careful design, this distance alone can add 2 to 3 nanoseconds to the settling time of the DAC when transmission-line effects are taken into consideration.

Phased-array switches have been produced in InP waveguide materials for RF (radio frequency) applications. The feasibility of using the phased-array concept in an optical communications network has been proven in academic research. Commercial efforts have been made to extend InP-based phased-arrays to create an N×M switch. At least one commercial vendor offers an 8×8 fast packet optical packet switch operating on a different principle, namely, a set of cascaded 2×2 interferometric switches made from Lithium Niobate. These switches are connected in a tree structure and coupled through evanescent coupling.

DESCRIPTION OF THE PREFERRED EXAMPLES

Figure 1:
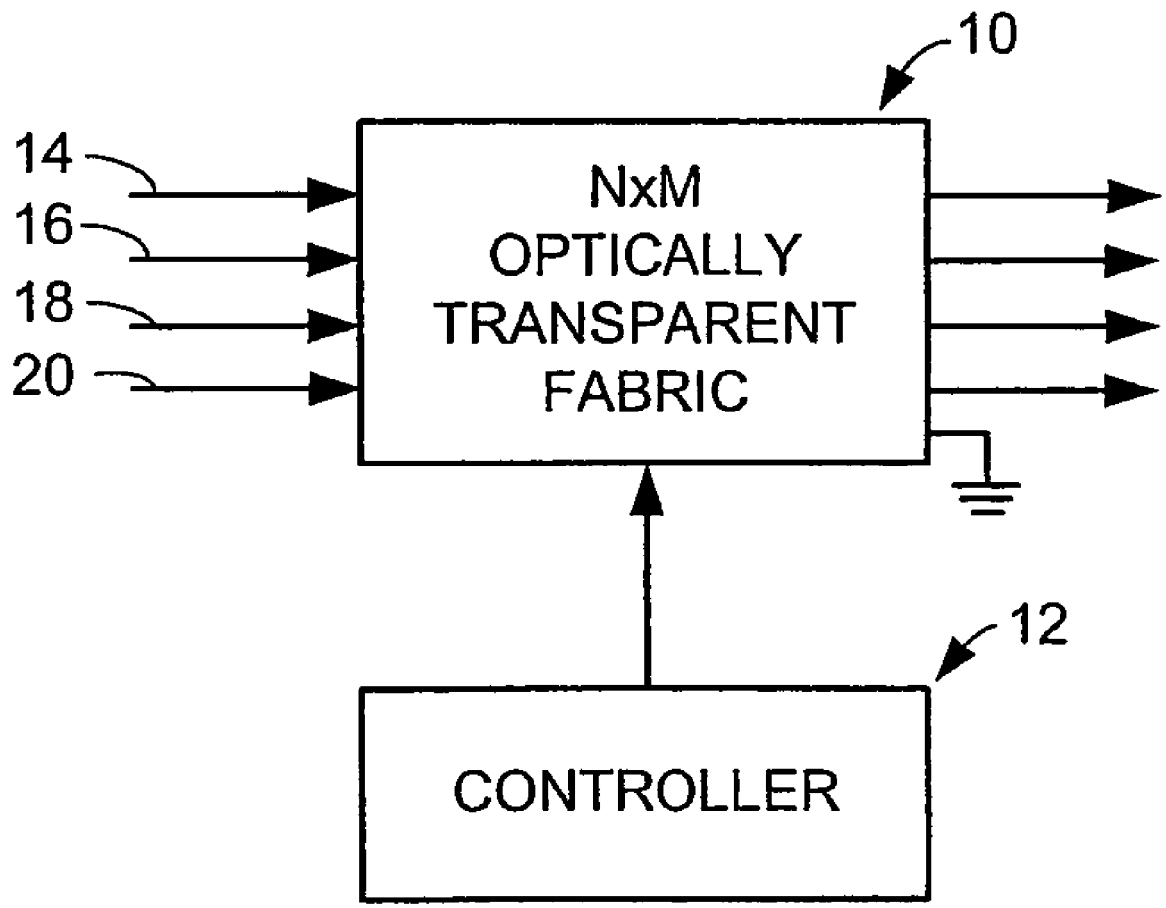
FIG. 1 illustrates an example N×M optically transparent fabric and a controller for the fabric.

A conventional N×M optically transparent fabric 10 is shown in FIG. 1. Persons of ordinary skill in the art will readily appreciate that the fabric 10 is intended to serve its switching function without introducing losses. Of course, due to various known physical limitations, some losses may be present. Persons of ordinary skill in the art will further appreciate that "N" refers to the number of inputs for the fabric 10, and "M" refers to the number of outputs for the fabric 10. N and M are integers that may be the same or different.

As shown in FIG. 1, the N×M optically transparent fabric 10 is serviced by a controller 12. The controller 12 provides a plurality of electrical control signals that dictate which of the M outputs receive the optical input signals received at the N inputs. Persons of ordinary skill in the art will readily appreciate that more than one optical input signal may be received at a given one of the N inputs at substantially the same time. For example, an input signal may comprise multiple channels of data (i.e., multiple optical signals modulated at different non-interfering wavelengths). As a result, the fabric 10 and controller 12 are capable of outputting an optical signal received on one input on two or more different outputs.

Figure 2:
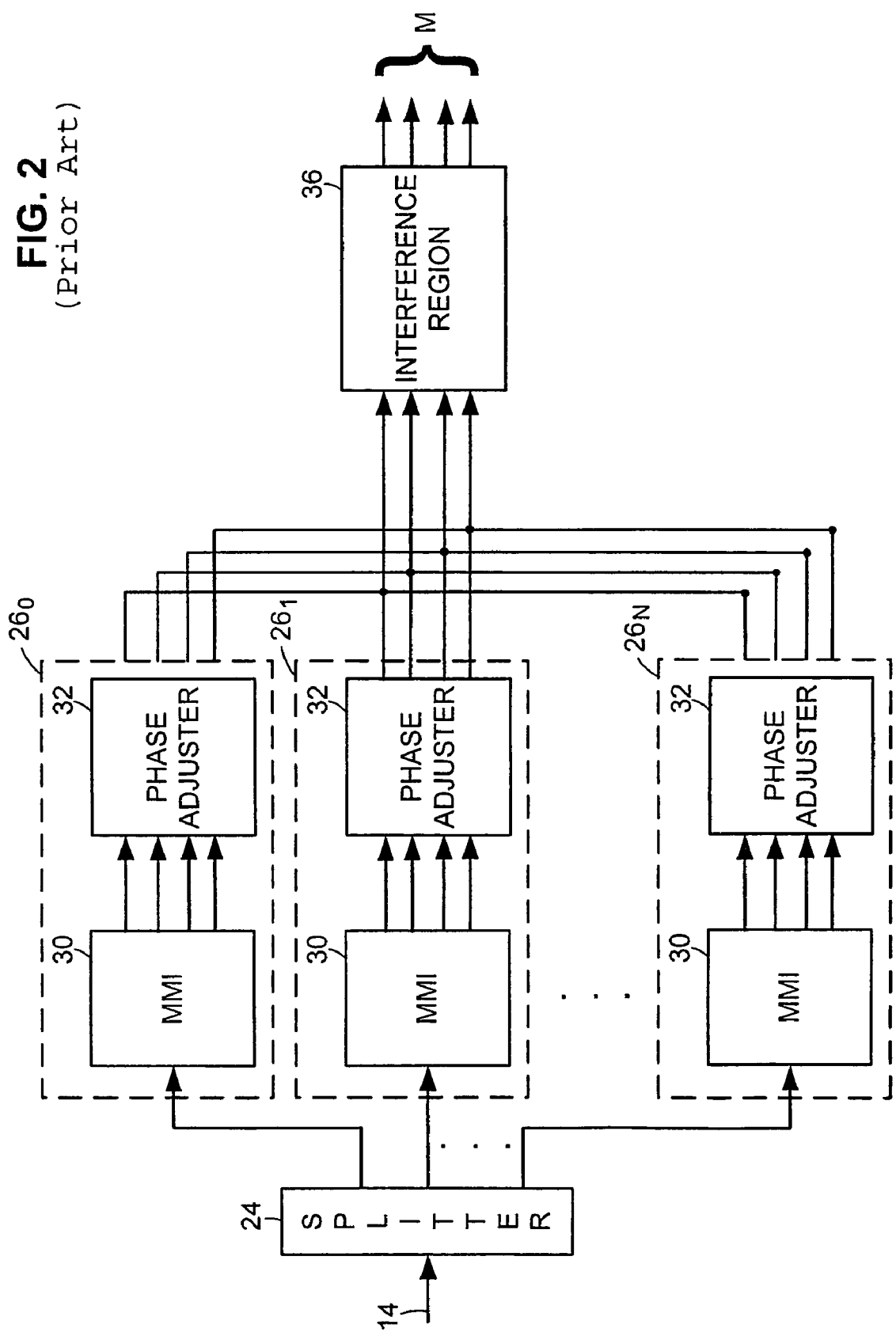
FIG. 2 illustrates one portion of the fabric of FIG. 1.

FIG. 2 illustrates one example path through the N×M optically transparent fabric 10 in greater detail. The illustrated path is associated with input 14 of FIG. 1, but persons of ordinary skill in the art will readily appreciate that inputs 16, 18 and 20 have similar or identical structure to that shown in the example of FIG. 2.

To split an optical signal containing two or more channels of data (i.e., signals modulated at different, non-interfering, wavelengths) into its subcomponents (i.e., the signals of different wavelengths), the fabric 10 is provided with a splitter 24. The splitter 24 can be implemented in any conventional manner. For example, it may be implemented by an arrayed waveguide grating sold by JDS Uniphase Corp. If only one signal is present on each input, or if it is desired to only route the signals received on each input as composite signals, persons of ordinary skill in the art will readily appreciate that the splitter 24 can be omitted as can the duplicate processing chains $26_1$-$26_N$.

In the example of FIG. 2, each processing chain $26_0$-$26_N$ includes a multimode interference splitter 30 and a phase adjuster 32. The multimode interference splitter 30 functions to subdivide an input signal (e.g., a signal received from the splitter 24, or, if no splitter 24 is employed, the input signal received on input 14) into multiple copies of itself on a like number of separate waveguides. Typically, a multimode interference splitter (MMI) 30 that produces four or more optical signals is used.

In the example illustrated in FIG. 2, each of the MMIs 30 develops four substantially identical signals. These signals are passed to a phase adjuster 32 as shown in FIG. 2. Each phase adjuster 32 acts on the set of identical signals it receives from its respective MMI 30 to create phase differences therebetween. The phase differences created are selected such that the signals output by each phase adjuster 32 create an interference pattern when discharged into an interference region 36 that causes the input signal received by the corresponding MMI to be reconstituted on a selected one of the M outputs. In this manner, any input signal(s) received on any given one of the N inputs can be routed to any of the M outputs.

As shown in FIG. 2, when multiple channels are present in a given input signal and a splitter 24 and multiple chains $26_0$-$26_N$ are employed, the outputs of the phase adjusters 32 of each of the chains $26_0$-$26_N$ can be combined into the same waveguides through known techniques such as evanescent coupling so that all of the signals can be steered via the same interference region 36. Alternatively, the coupling into the same waveguides can be eliminated such that the phase adjusters of each of the chains $26_0$-$26_N$ output separately and directly into a large interference region 36. Of course, because each of the signals split from the input signal received at input 14 can be processed by its own phase adjuster 32, multiple signals received at one of the N inputs can optionally be output on more than one of the M outputs.

Figure 3:
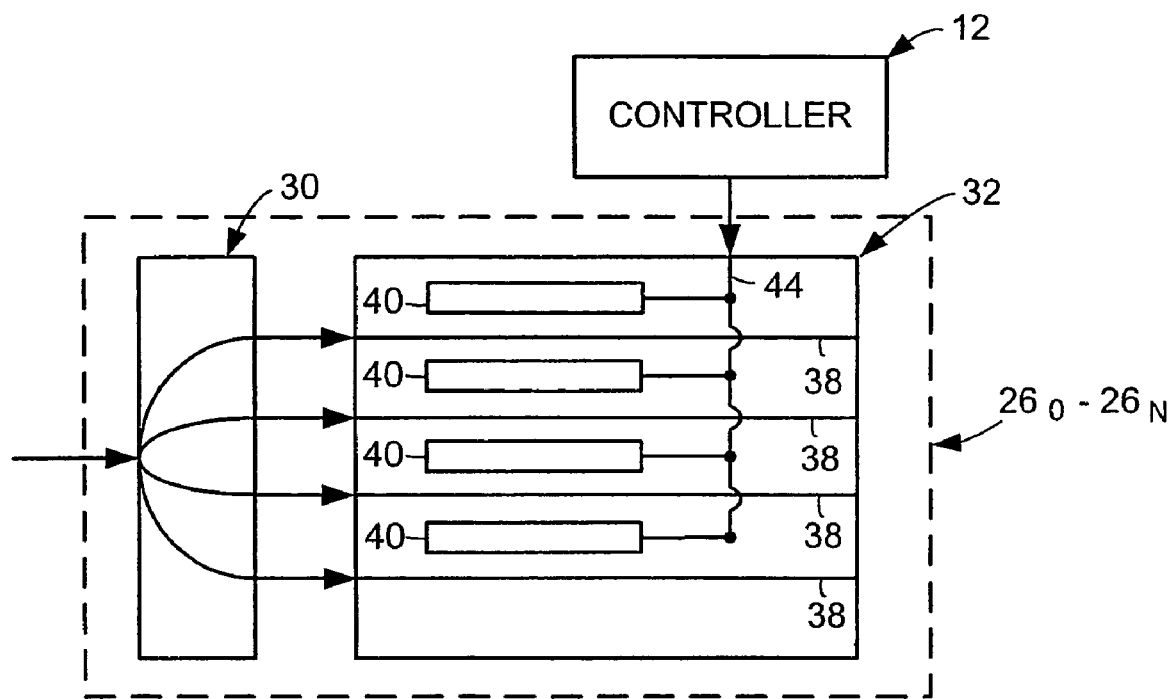
FIG. 3 illustrates a multimode interference splitter and phase adjuster of FIG. 2 in greater detail.

A more detailed view of one of the phase adjusting paths $26_0$-$26_N$ is shown in FIG. 3. As shown therein, each of the phase adjusters 32 includes a plurality of poly-trench waveguides 38. The number of waveguides 38 matches the number of duplicate signals developed by the corresponding MMI 30. The number of outputs of each MMI 30 is equal to M*k where "M" is the number of outputs of the fabric 10 and "k" is a positive integer. The larger the value of "k," the better clarity of beam steering will be achieved.

Each of the poly-trench waveguides 38 has an associated polysilicon trench capacitor 40. As is known, each of the capacitors 40 is embedded adjacent a respective one of the waveguides 38 such that, adjusting the charges accumulated on the capacitor(s) 40 changes the effective propagation velocity of light through the corresponding waveguide(s) 38. In other words, adjusting the voltage(s) applied to the capacitor(s) 40, adjusts the optical path length(s) of the corresponding waveguide(s) 38. Therefore, if different voltages are applied to the capacitors 40 of a phase adjuster receiving identical input signals, the relative phases of those input signals will be different when they exit the phase adjuster 32.

To control the voltages applied to the capacitors 40, the controller 12 is connected to each capacitor 40 via an electrical bus 44. The controller 12 sets the voltages to steer the input signals received via the N inputs to selected one(s) of the M outputs. Because the phase effects of the phase adjusters 32 can be changed at any time by changing the voltages on the capacitors 40, the controller 12 can reconfigure the fabric 10 to route signal(s) from any of the N inputs to any of the M outputs at any time. Thus, the fabric 10 can be used in a network to switch a large number of input signals to a large number of outputs. This might be useful, for example, in a telecommunications application in which optical communication links need to be rapidly erected and collapsed when phone calls or data connections are placed and ended.

Figure 4:
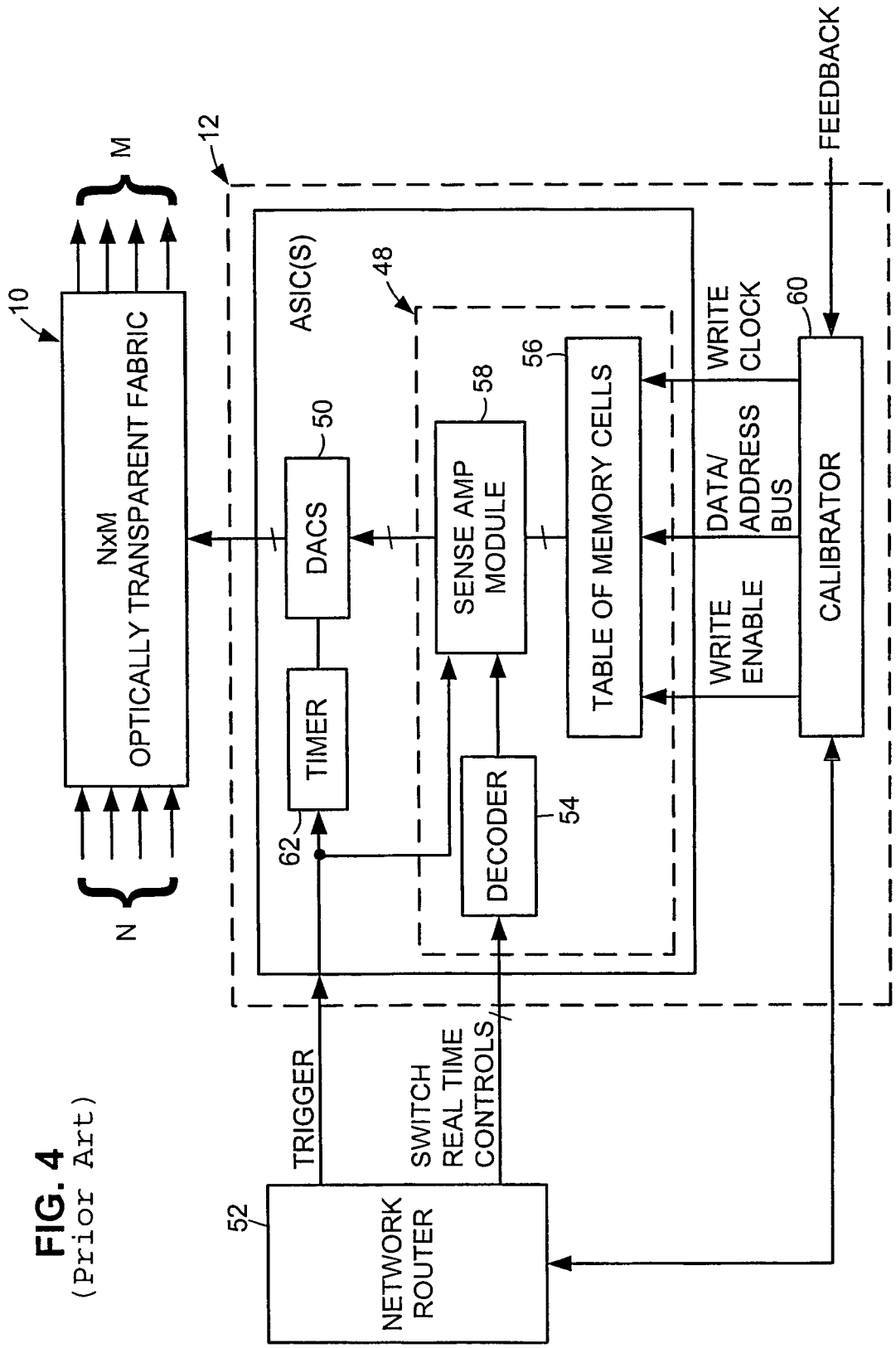
FIG. 4 illustrates the controller of FIG. 1 in greater detail.

An example controller 12 is shown in more detail in FIG. 4. The illustrated controller 12 includes a memory 48 to store configuration data identifying the voltages needed to change the optical path lengths of the plurality of optical paths 38 to achieve desired steering effects. It also includes a plurality of digital to analog converters (DACs) 50 to convert the configuration data output by the memory 48 to analog control signals which set the voltages of the capacitors 40 in the phase adjusters 32. In the example environment of use shown in FIG. 4, the memory 48 is responsive to an address signal received from a network router 52 to output a set of configuration data to the DACs 50 to configure the phase adjusters 32.

In the illustrated example, the memory 48 includes a conventional decoder 54 to decode the address signals received from the network router 52. It also includes a table of addressable memory cells 56 which store the configuration data. The address decoded by the decoder 54 identifies a segment of the memory cells 56 to be read out. The data in the memory cells 56 dictates the voltages applied to the capacitors 40 in the phase adjusters 32. Thus, by addressing different segments of the table 56, the router 52 causes the memory 48 to output configuration data to configure the fabric 10 to achieve the desired switching effect. The table 56 must store at least a number of bits equal to (k*M*N words)*(D bits/words) where "D" is the number of bits output by each of the DACs (e.g., 5 bits). As stated above, "D" is also the resolution of the voltage applied to the waveguide.

To couple data read from the memory cells in the table 56 to the DACs 50, the memory 48 is further provided with a sense amplifier module 58. The sense amplifier module 58, like the decoder 54 and the table of memory cells 56, is of conventional design. Thus, the sense amplifier module 58 includes a plurality of amplifiers designed to output digital signals representative of the data read from the table of memory cells 56 at levels appropriate for the DACs 50. The sense amplifier module 58 will output k*M*N*D digital control signals. The DACs will in turn output k*M*N control signals to the phase adjusters 32.

Because the operation of the optically transparent fabric 10 is sensitive to various conditions (e.g., it is temperature sensitive), the controller 12 is further provided with a calibrator 60. The calibrator 60 adjusts the configuration data in the memory 48 based on one or more monitored conditions such as, for example, the temperature of the fabric 10. To this end, the calibrator 60 is coupled to the table of memory cells 56 via a write enable line, a data/address bus, and a write clock line in a conventional manner. By manipulating the signals on these input connections, the calibrator 60 can write new data into the table 56 to optimize the behavior of the fabric 10. To this end, the calibrator 60 receives feedback signals indicative of environmental conditions and operating performance associated with the fabric 10.

The calibrator 60 of this example is implemented by a programmed microprocessor with an associated memory, as is conventional. To permit communication between the router 52 and the calibrator 60, the router 52 and calibrator 60 are coupled by a bi-directional auxiliary control channel such as an RS-232 connection.

The network router 52 performs network level management of the system. Thus, the router 52 is charged with the responsibility of selecting the configuration of the fabric 10 to achieve the needs of the overall communications network. When the router 32 determines that a particular configuration of the fabric 10 is needed to properly route data (e.g., voice data, etc.), it first sends an address signal to the decoder 54 requesting the necessary configuration of the fabric 10. The address is a real time control signal. The number of bits in this address signal may be equal to $(LOG_2 M)$ bits per channel)*(N channels).

After the address signal is sent to the decoder 54, the router 52 sends a trigger signal to the controller 12. The trigger signal is routed to a timer 62 and the sense amplifier module 58. The trigger signal advises the controller 12 that the fabric 10 should be immediately reconfigured since data is about to be sent through the fabric 10. The timer 62 operates to synchronize the trigger signal among all of the DACs 50 to keep everything operating in synchronicity. After delaying a time period sufficient to permit configuration of the fabric 10, the router 52 releases data to the fabric. The process is then repeated if a new network routing configuration is desired to be effected by the fabric 10.

Figure 5:
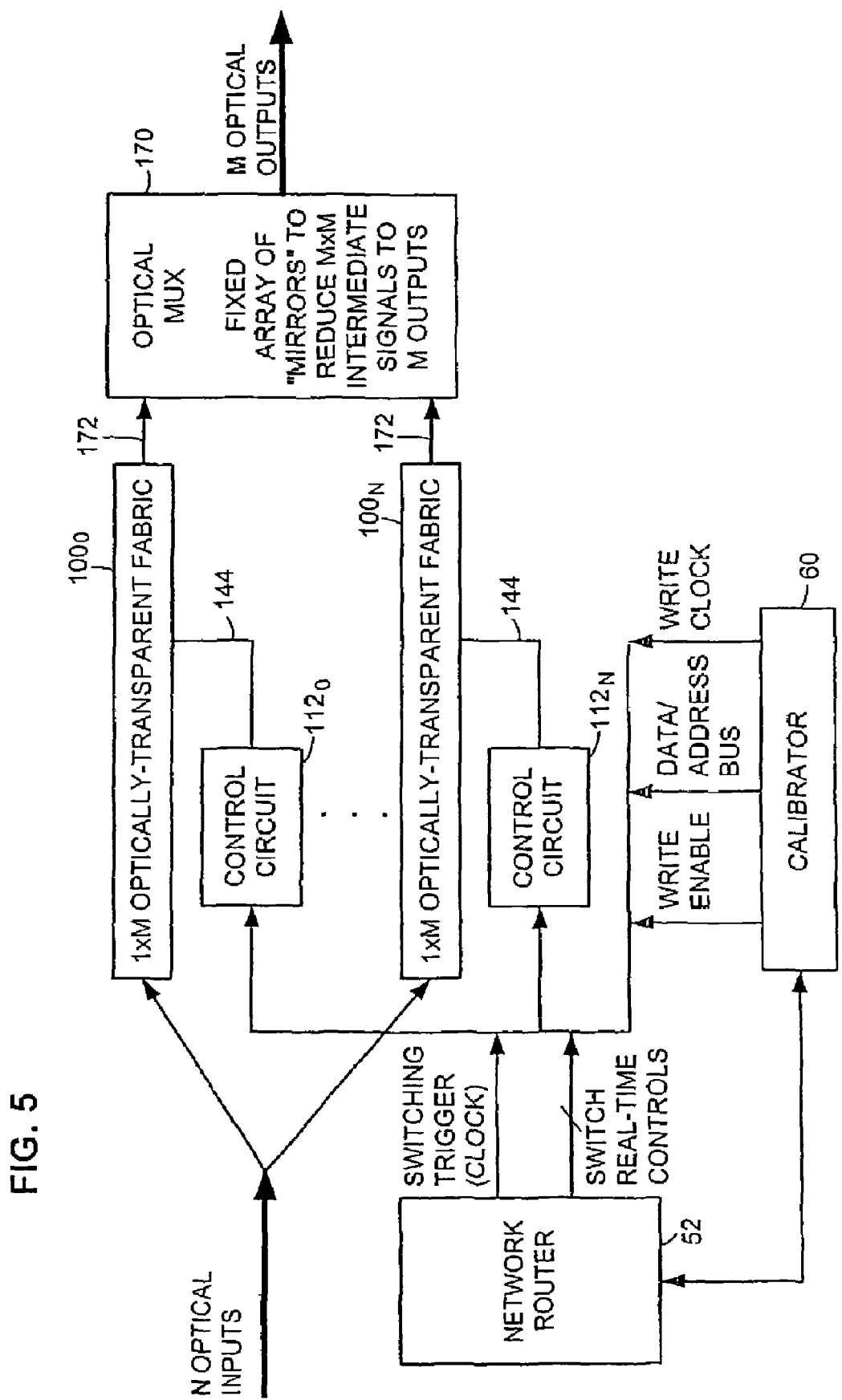
FIG. 5 illustrates an example apparatus constructed in accordance with the teachings of an embodiment of the invention.

The foregoing description describes the operation of a prior art N×M optically transparent fabric 10. An example apparatus constructed in accordance with the teachings of an embodiment of the invention is shown in FIG. 5. Identical structures are labeled with identical reference numerals in the examples of FIG. 5 and FIGS. 1-4. Structures appearing in the example of FIG. 5 which are analogous, but not identical to, structures appearing in the example of FIGS. 1-4 are labeled with the reference numerals from FIGS. 1-4 increased by "100" for ease of understanding.

In the example of FIGS. 1-4, only one N×M optically transparent fabric 10 was employed to route N input signals to M outputs. In contrast, in the example of FIG. 5, a plurality of optically transparent fabrics $100_0$-$100_N$ are employed. Rather than receiving and operating upon all "N" input signals, each of the optically transparent fabric $100_0$-$100_N$ receives a subset of the N input signals. In the example illustrated in FIG. 5, there are "N" fabrics 100. Therefore, each of the "N" fabrics is a 1×M fabric which receives only a respective one of the N input signals.

In the example of FIGS. 1-4, one massive control circuit 12 was used to configure the N×M fabric 10. In contrast, in the example of FIG. 5, a plurality of control circuits $112_0$-$112_N$ are provided. While it is possible for each of the control circuits $112_0$-$122_N$ to control two or more of the fabrics $100_0$-$100_N$, in the example illustrated in FIG. 5, each of the control circuits $112_0$-$112_N$ controls a respective one of the 1×M fabrics $100_0$-$100_N$.

In the example of FIG. 5, each of the 1×M fabrics $100_0$-$100_N$ has the structure shown in FIG. 2. Thus, each of the fabrics $100_0$-$100_N$ includes a splitter 24, one or more phase adjustment chains $26_0$-$26_N$, and an interference region 36. Each of the chains $26_0$-$26_N$ includes an MMI 30 and a phase adjuster 32 as explained above. Alternatively, all the splitters can be located up front, and the number of 1×M fabrics $100_0$-$100_N$ can equal the number of data channels entering the system.

Also, each of the phase adjusters 32 used in the example of FIG. 5 is structured like the phase adjuster 32 shown in FIG. 3. Thus, each phase adjuster 32 includes a plurality of optical paths 38, a plurality of poly-trench capacitors 40, and an electrical control bus 144. Because, in the example of FIG. 5, each fabric 100 is provided with its own controller $112_0$-$112_N$, each bus 144 is smaller, simpler, and shorter than the bus 44 of the example of FIGS. 1-4.

Each of the control circuits $112_0$-$112_N$ of FIG. 5 is also very similar to the control circuit 12 of FIGS. 1-4. In particular, each of the control circuits $112_0$-$122_N$ includes a plurality of DACs 50, and a memory 48 including a decoder 54, a table of memory cells 56 and a sense amplifier module 58. Because, in the example of FIG. 5, each control circuit $112_0$-$112_N$ controls only one 1×M fabric $100_0$-$100_N$, the size and complexity of each control circuit $112_0$-$112_N$ is reduced as compared to the control circuit 12. For example, the sense amplifier module 58 of the control circuits $112_0$-$112_N$ are smaller. The number of DACs 50 in each of the control circuits $112_0$-$112_N$ is likewise smaller than were required in the control circuit 12. Because of this significant simplification, timers 62 are not needed in the control circuits $112_0$-$112_N$ to maintain synchronicity.

In the example of FIG. 5, only a single calibrator 60 is used. The calibrator 60 operates in the same manner in the example of FIG. 5 as it did in the example of FIGS. 1-4. However, the calibrator 60 and the bus structure between the calibrator 60 and the various control circuits $112_0$-$112_N$ must be adapted to accommodate the increased number of control circuits $112_0$-$112_N$ and the increased number of fabrics $100_0$-$100_N$. Significantly, the decreased sizes of the fabrics $100_0$-$100_N$ relative to fabric 100 translates into greater temperature uniformity in the individual fabrics $100_0$-$100_N$ than was present in the larger fabric 10. (The larger fabric 10 would typically tend to be hotter in the middle than near the edges). This increased thermal uniformity translates into a greater ability to monitor conditions (such as temperature) and compensate for those conditions. To this end, the calibrator 60 can adjust the values in the tables 56 of the control circuits $112_0$-$112_N$ independently of one another. This independent adjustability permits the calibrator 60 to, for example, calibrate each of the fabrics $100_0$-$100_N$ differently to reflect each fabric's $100_0$-$100_N$ unique characteristics and environment.

The network router 52 of the example of FIG. 5 operates identically to the router 52 of the example of FIGS. 1-4. However, the address signal and the trigger signal from the router 52 is delivered to each of the control circuits $112_0$-$112_N$ in the example of FIG. 5 instead of to one control circuit 12 as was done in the examples of FIGS. 1-4.

Each of the 1×M fabrics $100_0$-$100_N$ of the example of FIG. 5 has M outputs. Thus, in the example of FIG. 5, the fabrics $100_0$-$100_N$ produce N sets of M intermediate outputs. To couple those N sets of intermediate outputs to the M outputs of the overall apparatus, the apparatus of FIG. 5 is further provided with an optical multiplexer 170. The output signals of the fabrics $100_0$-$100_N$ are coupled to the inputs of the multiplexer 170 by waveguides 172. The multiplexer 170 can be implemented by a fixed array of mirrors in a known fashion to combine the N sets of M intermediate output signals into one set of M output signals. The multiplexer 170 can be readily manufactured using MEM(s) (micro-electromechanical systems) etching techniques in silicon, or can be manufactured using other well known micro-optics techniques. The multiplexer 170 functions to couple multiple sets of inputs to the same set of outputs.

In operation, the network router 52 instructs the control circuits $112_0$-$112_N$ to configure their respective fabrics $100_0$-$100_N$ to switch N optical input signals to desired ones of M optical outputs. Each of the N optical input signals is then coupled to a respective one of the 1×M optically transparent fabrics $100_0$-$100_N$. Each of the 1×M fabrics $100_0$-$100_N$ functions as an optical switch that selectively couples a received input signal to one or more of the input ports of the multiplexer 170. In particular, each of the 1×M fabrics $100_0$-$100_N$ switches its respective input signal to at least one of its intermediate outputs. The intermediate outputs of the 1×M fabrics $100_0$-$100_N$ are then guided via waveguides 172 into the multiplexer 170 which, in turn, multiplexes the intermediate outputs of the fabrics $100_0$-$100_N$ into the M optical outputs.

From the foregoing, persons of ordinary skill in the art will appreciate that methods and apparatus have been disclosed for switching N optical input signals to M optical outputs. The disclosed methods and apparatus avoid time synchronization and power density problems associated with the prior art.

Persons of ordinary skill in the art will further appreciate that, in the disclosed approaches, the fabrics $100_0$-$100_N$ can be spaced apart and interleaved with their respective driver chips $112_0$-$112_N$. This interleaving minimizes the trace lengths of the connections between the drivers and the fabrics and the associated impact on settling time due to round trip delays and electrical cross-talk. It also allows for a stiffer power supply distribution network that can handle the peak current density without significant droop. It also decentralizes power dissipation and eliminates heat gathering points thereby allowing for better control of the temperature transients of the optical waveguides.

Optical cross-talk must be tightly controlled to meet the specifications of an optical network. For a given interference region of a beam-steering switch, each time an additional input is added, cross-talk will increase proportionately. Since the cross-talk performance of the optical multiplexer 170 is superior to that of the interference region of a beam-steering stage, it makes sense to reduce the number of optical inputs for each of the beam-steering fabrics $100_0$-$100_N$, and then join the intermediate output signals at the multiplexer 170. By separating the "fast" components (i.e., the components that can be quickly re-configured such as the capacitors 40 and their waveguides 38) from the fixed multiplexer 170, one can fabricate the fixed portion (i.e., the multiplexer 170) from the technology that gives the best price-to-performance value.

Although certain methods and apparatus performed and/or constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus comprising:
    an optical multiplexer having a first plurality of input ports coupled to a plurality of output fibers and a second plurality of input ports coupled to the plurality of output fibers;
    a first optical switch to selectively couple a first optical signal from a first input to at least one selected input port of the first plurality of input ports of the multiplexer;
    a first control circuit to configure the first optical switch to select the at least one selected input port of the first plurality of input ports of the multiplexer;
    a second optical switch to selectively couple a second optical signal from a second input to at least one selected input port of the second plurality of input ports of the multiplexer; and
    a second control circuit to configure the second optical switch to select the at least one selected input port of the second plurality of input ports of the multiplexer,
    wherein the first optical switch comprises:
        a multimode interference splitter;
        a plurality of optical paths to receive optical signals from the multimode interference splitter;
        a plurality of capacitors associated with the plurality of optical paths such that changes in voltage associated with the capacitors changes optical path lengths of corresponding ones of the plurality of optical paths;
        a beam steering interference region; and
        a plurality of output waveguides to deliver a signal received from the beam steering interference region to the at least one selected input port in the first plurality of input ports of the multiplexer,
    wherein the first control circuit comprises:
        a memory to store configuration data identifying the voltages needed to change the optical path lengths of the plurality of optical paths to select the at least one selected input port of the first plurality of input ports; and
        a plurality of digital to analog converters to convert the configuration data output by the memory to analog control signals.

2. An apparatus as defined in claim 1 wherein the memory is responsive to an address signal received from a network router to output a set of the configuration data to configure the first control circuit.

3. An apparatus as defined in claim 2 wherein the memory further comprises:
    a decoder to decode the address signal received from the network router;
    a plurality of addressable memory cells to store the configuration data; and
    a sense amplifier module to couple data read from the memory cells to the digital to analog converters.

4. An apparatus as defined in claim 1 further comprising a calibrator to adjust the configuration data in the memory based on at least one monitored condition.

5. An apparatus as defined in claim 4 wherein the at least one monitored condition is a temperature of the first optical switch.

6. An apparatus to switch N optical input signals received via N optical inputs to M optical outputs comprising:
    a plurality of optically transparent fabrics, each of the optically transparent fabrics receiving at least one of the optical input signals to switch the at least one received optical input signal to at least one of a plurality of intermediate outputs;

a multiplexer operatively coupled between the intermediate outputs of the plurality of optically transparent fabrics and the M optical outputs; and a plurality of control circuits associated with the optically transparent fabrics;

wherein at least one of the optically transparent fabrics further comprises:

a splitter to split at least one of the optical input signals into a plurality of sub-input signals;

a plurality of optical paths;

a plurality of capacitors to selectively change optical path lengths of the optical paths; and an interference region, and wherein the control circuit associated with the at least one of the optically transparent fabrics is to control voltages associated with the capacitors and further comprises:

a memory to store configuration data identifying the voltages needed to change the optical path lengths of the plurality of optical paths to select the at least one selected input port of the first plurality of input ports; and a plurality of digital to analog converters to convert the configuration data output by the memory to analog control signals.

7. An apparatus as defined in claim 6 wherein the memory is responsive to an address signal received from a network router to output a set of the configuration data to configure the control circuit associated with the at least one of the transparent fabrics.

8. An apparatus as defined in claim 7 wherein the memory further comprises:

a decoder to decode the address signal received from the network router;

a plurality of addressable memory cells to store the configuration data; and a sense amplifier module to couple data read from the memory cells to the digital to analog converters.

9. An apparatus as defined in claim 6 further comprising a calibrator to adjust the configuration data in the memory based on at least one monitored condition.

10. An apparatus as defined in claim 9 wherein the at least one monitored condition is a temperature of the first optical switch.

* * * * *